Figure 1:
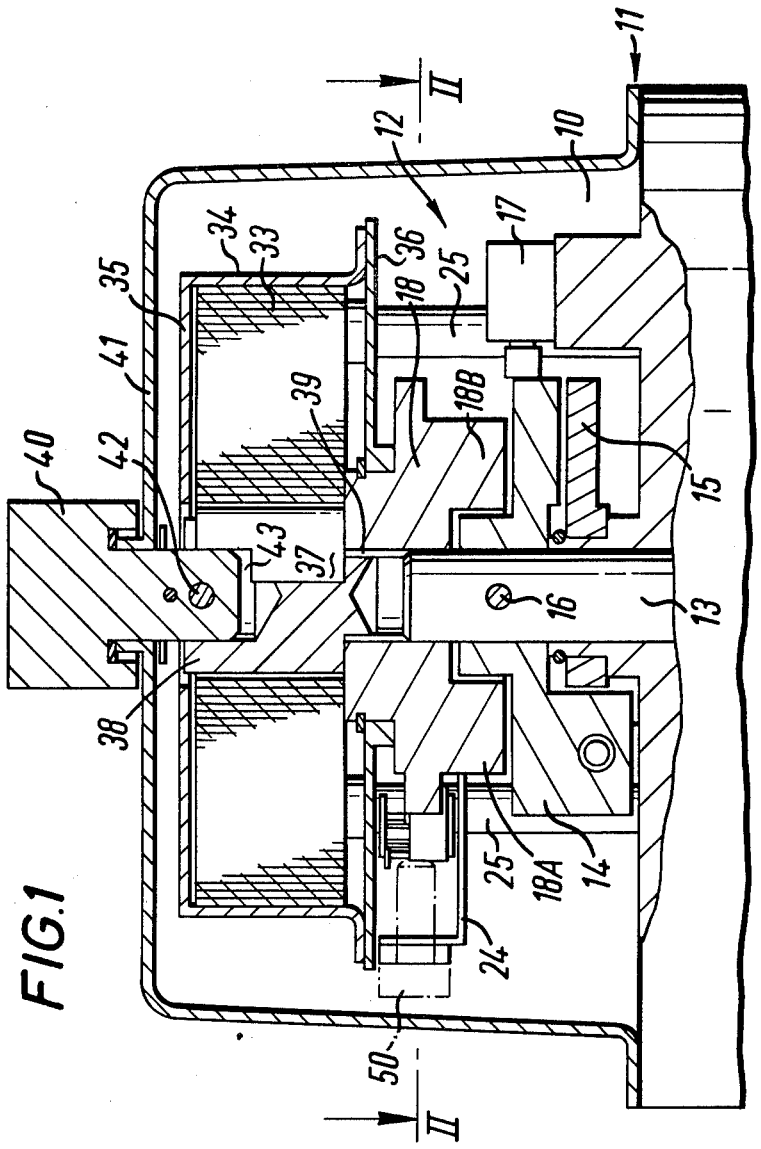

United States Patent [19]

Hore

[11] 4,289,038
[45] Sep. 15, 1981

[54] FAIL-SAFE ATTACHMENT FOR AN ACTUATOR

[75] Inventor: Donald L. Hore, Bristol, England

[73] Assignee: Rotork Limited, Bath, England

[21] Appl. No.: 22,056

[22] Filed: Mar. 19, 1979

[30] Foreign Application Priority Data

Apr. 7, 1978 [GB] United Kingdom ............... 13758/78

[51] Int. Cl.³ .................. G05G 17/00; F03G 1/00
[52] U.S. Cl. ............................. 74/2; 185/39; 251/69
[58] Field of Search .................. 74/2; 185/39; 251/69

[56] References Cited

U.S. PATENT DOCUMENTS

| | | | |
|---|---|---|---|
| 1,134,892 | 4/1915 | Myszkier | 74/2 |
| 1,559,018 | 10/1925 | Taylor | 251/69 X |
| 2,568,916 | 9/1951 | Godefroy | 74/2 |
| 2,875,616 | 3/1959 | Marks | 251/69 X |
| 4,113,063 | 9/1978 | Troy | 251/69 X |

Primary Examiner—Allan D. Herrmann
Attorney, Agent, or Firm—Stevens, Davis, Miller & Mosher

[57] ABSTRACT

An actuator has a fail-safe mechanism operable by a spring. The spring is normally held inoperable by electrical means so that the fail-safe mechanism is independent of the normal operation of the actuator. The fail-safe mechanism is rendered operative by failure of the electrical supply so that the spring rotates a cam plate which is coupled with the switch plate so as to move the output shaft to a predetermined fail-safe position by the stored energy of the spring force.

9 Claims, 2 Drawing Figures

FAIL-SAFE ATTACHMENT FOR AN ACTUATOR

This invention relates to a fail-safe attachment for actuators, and more particularly but not exclusively, to such an attachment for electrically operated actuators which produce a predetermined angular movement of an output member for operating a semi-rotary device to be actuated, for example a quarter-turn valve such as a butterfly or ball valve. One such electrically operated quarter-turn actuator of this kind is described and claimed in our co-pending appln. No. 862,092, now U.S. Pat. No. 4,177,395 and the fail-safe attachment of the present invention has particular use with such an actuator in that it provides for emergency operation of the actuator to a desired fail-safe position in the event of, or during power failure without in any way affecting the normal operation of the actuator.

Hithertofore, when operation of a valve by an actuator under power failure conditions is needed, some form of stored energy is essential for moving the valve to its fail-safe position. The energy store is most conveniently a spring and generally most powered valves using spring energy are controlled by a single-acting actuator against a return spring. In such arrangements the spring must be powerful enough in its most extended condition to provide the required force at the end of valve travel, while the power actuator must be powerful enough to overcome the spring force, which increases as the spring is compressed, as well as providing the force needed to operate the valve. These factors mean inevitably that the power actuator must have a force capability of two or three times the force required by the valve itself. At the same time, the actuator must remain energised as long as the valve is to be held in position against the spring. This is a considerable disadvantage in the case of electrically operated actuators as it means that there is a continuous electrical drain while the valve is held immobile, e.g. held in its open position. It also means that loss of power automatically causes valve operation, when the actual need may be for a means of emergency operation during power failure conditions.

The main object therefore, of this invention is to provide the stored energy capability of a spring for emergency operation of a valve normally powered by an electrically operated double-acting actuator without reducing the power available to operate the valve from a given actuator, and eliminating the problem of continuous power consumption while the valve is in its normal, as opposed to emergency position.

An additional object of the invention is to prevent unnecessary discharge of the spring on power failure if the valve is already in the 'safe' position.

As previously mentioned the invention is more particularly applicable to quarter-turn valve actuators and in one preferred embodiment the emergency power is supplied by a spring which is manually compressed until the required energy for the emergency stroke is stored.

The spring drives a rotatable fail-safe cam plate coupling which is normally held against movement to retain the spring charge by a latch under the control of an electro-magnet. The electro-magnet can be energized either by the actuator power supply voltage or by a separate 'safe' supply, e.g. from a d.c. battery. The arrangement is such that the latch retains the spring charge so long as the electro-magnet remains energised. When the electro-magnet is de-energised, e.g. on loss of power supply if connected to it, or on deliberate disconnection of the 'safe' supply during power failure conditions, a small release spring forces the armature away from the electro-magnet which allows the main spring to overcome the latch and to rotate the fail-safe cam plate coupling.

In the application of the invention to a quarter-turn actuator as described in our appln. No. 862,092, now U.S. Pat. No. 4,177,395 the fail-safe cam plate coupling is drivably connected with the switch cam plate by means of a coupling incorporating adequate backlash, e.g. 110°. The arrangement enables the actuator to operate normally in both directions of movement by electrical power in response to the appropriate open and close signals even though the spring is charged. Only when the latch is released can the spring override the actuator and force the valve to its fail-safe position by rotation of the switch cam plate.

Figure 2:
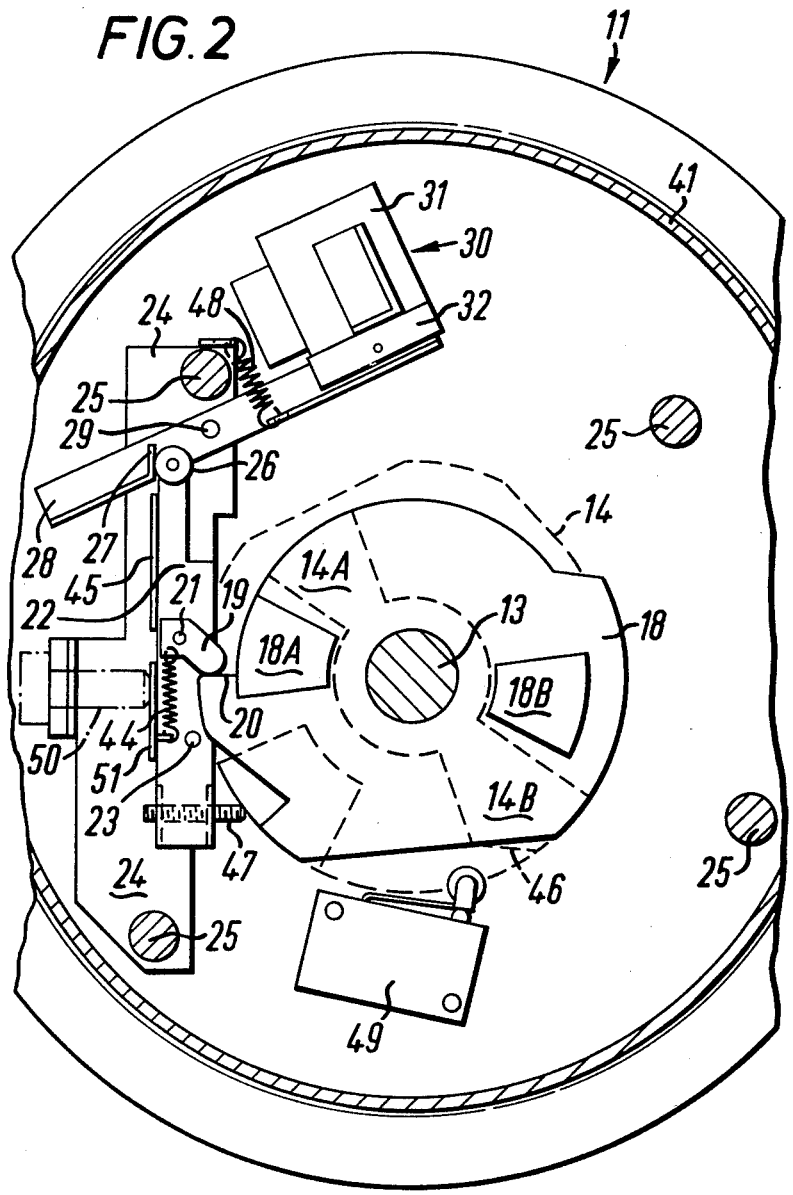

In order that the invention may be clearly understood the preferred embodiment will now be described in greater detail as applied to an electrically operated quarter-turn actuator of the kind disclosed in our co-pending appln. No. 862,092, now U.S. Pat. No. 4,177,395. This embodiment is given by way of example only and is shown in the accompanying drawings in which:

FIG. 1 is a sectional side elevation of the fail-safe attachment as fitted to the upper end of the rotor shaft of the actuator, and FIG. 2 is a section on the line II—II of FIG. 1.

Referring to FIG. 1 the drawing shows the upper compartment 10 of the actuator 11 and which contains the fail-safe attachment 12 of the invention.

As shown the upper end of the rotor shaft 13 projects into the compartment 10 and is provided therein with the switch cam plate 14 and its lower interlocked plate 15. As shown, switch cam plate 14 is pinned at 16 to shaft 13 which is mounted on the valve at its lower end and the function of these two plates 14 and 15 is described in the co-pending appln. No. 862,092, now U.S. Pat. No. 4,177,395. A switch 17 is shown in FIG. 1 as indicative of the various switches actuated by switch cam plate 14 in the control of the actuator. The switch cam plate 14 is shown in dotted lines in FIG. 2 for clarity.

The fail-safe attachment 12 includes a fail-safe cam plate coupling 18 which is shown in full lines in FIG. 2 and which has on its under-surface diametrically positioned abutments 18A and 18B which are adapted to engage similar raised abutments 14A and 14B on switch cam plate 14 upon rotation of fail-safe cam plate coupling 18 which is freely mounted on the upper end of shaft 13.

The angular distance between adjacent side edges of the abutments 18A and 18B is such that the backlash provided for the abutments 14A and 14B is more than 110° thus enabling the switch cam plate 14 to rotate fully during normal operation of the actuator without being affected by the fail-safe cam plate coupling 18.

In the embodiment shown the shaft 13 as viewed in FIG. 2 rotates anti-clockwise to its valve open position and the fail-safe attachment 12 has been fitted to the shaft 13 to rotate the shaft clockwise during emergency operation so as to close the valve.

The cam plate coupling 18 is restrained during normal operation of the actuator from clockwise rotation as viewed in FIG. 2 by a latch pawl 19 which as shown is engaged by an abutment 20 on the cam plate 18. The latch pawl 19 is pivotally mounted at 21 on a latch lever 22 which itself pivots about a fixed pin 23 mounted on the support chassis 24 which is carried by two of the four support pillars 25 attached to the actuator housing.

The clockwise torque applied by cam plate coupling 18 to lever 22 via pawl 19 (as will be herein described) tends to turn the lever 22 anti-clockwise about its pivot pin 23. This movement is restrained by a roller 26 on the end of lever 22 and which engages a ramp 27 on a magnet lever 28 which is pivotted about a fixed pin 29 mounted on the chassis 24. The anti-clockwise pressure from roller 26 on ramp 27 tends to turn the magnet lever 28 clockwise but it is restrained by a fixed electro-magnet 30 so long as its coil 31 is energised, the armature 32 of the electro-magnet being mounted on the lever 28. The electro-magnet 30 is connected to an electrical supply (not shown) so that the electro-magnet will become de-energised upon disconnection, e.g. on power failure or a deliberate emergency trip.

Clockwise rotation of the fail-safe cam plate coupling 18 is in response to the stored energy of a spiral spring 33 which is manually set and which as shown in FIG. 1 is located in compartment 10 above the cam plate coupling 18. The spring 33 is preloaded to the requisite minimum (spring extended) torque on assembly when its outer end is secured to wall 34 of the supporting housing 35 which is mounted on a chassis 36 carried by the four pillars 25 attached to the actuator housing. The inner end 37 of the spring 33 is retained by an arbor 38 which is turned clockwise by the spring 33. The cam plate coupling 18 is coupled directly with the arbor 38 by drive dogs 39 and the arbor 38 can be turned manually to set the spring 33 by an external knob 40 retained rotatably in the top cover 41 of the actuator and which has a drive pin 42 engaging a key slot 43 in the arbor 38.

Assuming the electro-magnet 30 is energised the fail-safe attachment 12 can be set by turning the knob 40 anti-clockwise which sets the spring 33 and also rotates cam plate coupling 18 anti-clockwise. The attachment 12 is set for operation when the fail-safe cam plate coupling 18 is latched as shown in FIG. 2 by engagement of abutment 20 with the latch pawl 19. The pawl 19 is free to turn clockwise about pin 21 during the anti-clockwise rotation of cam plate coupling 18 against a spring 44 so as to permit overtravel of the cam plate coupling 18, the pawl 19 then springing back into place against an edge 45 upstanding from latch lever 22.

In FIG. 2 the actuator is shown at the end of its anti-clockwise direction of travel in which the valve is in its open position. In this condition of the actuator the limit switch cam plate 14 is in the position shown with the abutment 14A, 14B closely adjacent the abutments 18A, 18B on fail-safe cam plate coupling 18.

In the event of de-energisation of electro-magnet 30 due to power failure, etc., the electro-magnet will release its hold on magnet lever 28 which will then turn clockwise about its pivot 29 due to the force on ramp 27 by roller 26, the force being produced by the stored energy in spring 33 transmitted through fail-safe cam plate coupling 18 to pawl 19 which turns lever 22 in an anti-clockwise direction about its pivot 23. The clockwise rotation of magnet lever 28 permits anti-clockwise rotation of lever 22 which is pushed away by cam plate coupling 18 which is then rotated clockwise by spring 33 via arbor 38. The clockwise rotation of cam plate coupling 18 is then transmitted by abutments 18A and 14A, and 18B and 14B to switch cam plate 14 which in turn is rotated clockwise to move shaft 13 to its mechanical limit of travel in which the valve is in its closed fail-safe position.

The switch cam plate 14 is provided with an inclined surface 46 on abutment 14B and which in the fail-safe position engages an adjustable stop screw 47 on latch lever 22 to reset the lever. The magnet lever 28 is then reset by a tension spring 48 connected to chassis 24.

The clockwise rotation of the fail-safe cam plate coupling 18 is also arranged to actuate the switch 49 (FIG. 2) which may be adapted to signal loss of spring charge and also to prevent any further electrical operation of the actuator until the spring 33 is recharged by the anti-clockwise movement of the cam plate coupling 18 as previously described.

It will be appreciated that the fail-safe operation described above will occur in response to disconnection of electro-magnet 30 at any time during the stroke of the actuator. However, it is unnecessary to release the spring 33 if the valve is already in the safe position when the power fails and the mechanism therefore includes a mechanical interlock which holds the latch lever 22 in the spring restrained position when the valve is in the safe position irrespective of whether the coil 31 of the electro-magnet 30 is energised or not. This is accomplished by the engagement as already described of the surface 46 on cam 14 with screw 47 on latch lever 22 when the actuator is in its fully clockwise position and which therefore prevents anti-clockwise movement of latch lever 22.

The fail-safe attachment 12 also includes means to lock the mechanism out of action while in the spring charged condition. This enables the actuator to function normally for test purposes without a latch coil supply and also allows stock units with a fail-safe attachment to be used for non-fail-safe application if required. This lock-out facility is provided by the mounting of a screw 50 in the chassis 24 and which engages the upstanding edge 51 of the latch lever 22 when screwed-in to prevent spring release. The screw 50 must be withdrawn to put the fail-safe attachment 12 into commission.

The invention provides a spring operated fail-safe attachment which is manually set and which is independent of the normal operation of the actuator in either direction of movement. The invention thereby overcomes the disadvantages of previously known fail-safe arrangements as hereinbefore mentioned.

I claim:

1. A part-turn actuator having a rotatable output member and a cam plate mounted on said output member for rotation therewith to actuate at least one switch for the control of the actuator, said actuator having a fail-safe mechanism comprising:
   a rotatable spring operated cam plate coupling;
   means for manually setting said spring and for rotating said cam plate coupling in one direction of rotation to an inoperative position;
   latch means for holding said cam plate coupling in said inoperative position;
   said fail-safe mechanism being independent of the normal operation of the actuator when said cam plate coupling is held in its inoperative position;
   said latch means comprising:
   a first movable lever positioned by electrical means;
   a second movable lever having one end engageable with said first movable lever, a pawl pivotally mounted to said lever;

said electrical means, when energized, holding said first movable lever in an inoperative position urging said second movable lever in a direction for engaging said pawl to said cam plate coupling, latching it in an inoperative position, said pawl being pivotally movable to allow rotation of said cam plate coupling in said one direction of movement to latch said cam plate coupling by said pawl in its inoperative position, said mechanism being rendered operative by an interruption of electrical current to said electrical means, the deenergization of said electrical means releasing said first movable lever to allow movement of said first movable lever from its inoperative position to a position for releasing said second lever disengaging said pawl, whereby said cam plate coupling is released so as to rotate in its other direction to engage drivably the switch cam plate moving the output member of the actuator to a predetermined fail-safe position by the stored energy of the spring force.

2. An actuator as claimed in claim 1, wherein the actuator is electrically operated and the fail-safe mechanism is rendered operative by failure of an electrical power supply connected to said electrical means.

3. An actuator as claimed in claim 1 wherein the actuator is double-acting and the fail-safe mechanism when held inoperative is independent of the operation of the actuator in both directions of movement.

4. An actuator as claimed in claim 3, wherein the switch cam plate is freely rotatable independently of the fail-safe cam plate coupling in both angular directions of movement of the actuator during normal operation of the actuator.

5. An actuator as claimed in claim 4, wherein the fail-safe cam plate coupling is held against rotation movement by latch means which are rendered inoperative to release the cam plate coupling upon disconnection of the coil of an electro-magnet.

6. An actuator as claimed in claim 5, wherein the latch means includes a mechanical interlock for preventing operation of the latch means and release of the spring force when the actuator is in its predetermined fail-safe position.

7. An actuator as claimed in claim 6, wherein the interlock comprises an abutment member carried by the lever of the latch means and engagable with a corresponding abutment surface on the switch cam plate in the predetermined fail-safe position of the actuator so as to prevent release movement of said lever.

8. An actuator as claimed in claim 1, including one or more switch contacts made when the spring is set and latched.

9. An actuator as claimed in claim 8, wherein one of the switch contacts is used to prevent power operation of the actuator before the spring has been set.

* * * * *